US012159521B2

(12) United States Patent
Forster

(10) Patent No.: US 12,159,521 B2
(45) Date of Patent: Dec. 3, 2024

(54) CONTROL OF RFID DEVICES FOR INCREASED RELIABILITY AND EFFECTIVENESS IN AN RFID ELECTRONIC ARTICLE SURVEILLANCE SYSTEM

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 83 days.

(21) Appl. No.: 17/760,071

(22) PCT Filed: Feb. 5, 2021

(86) PCT No.: PCT/US2021/016842
§ 371 (c)(1),
(2) Date: Aug. 3, 2022

(87) PCT Pub. No.: WO2021/158931
PCT Pub. Date: Aug. 12, 2021

(65) Prior Publication Data
US 2023/0068929 A1 Mar. 2, 2023

Related U.S. Application Data

(60) Provisional application No. 62/970,913, filed on Feb. 6, 2020.

(51) Int. Cl.
*G08B 13/24* (2006.01)

(52) U.S. Cl.
CPC ....... *G08B 13/244* (2013.01); *G08B 13/2417* (2013.01); *G08B 13/2477* (2013.01)

(58) Field of Classification Search
CPC ........... G08B 13/2417; G08B 13/2482; G08B 13/2457; G08B 13/2485; G08B 13/2431
See application file for complete search history.

(56) References Cited

U.S. PATENT DOCUMENTS 5,257,009 A 10/1993 Narlow
5,767,808 A 6/1998 Robbins et al.
(Continued)

FOREIGN PATENT DOCUMENTS

JP 10-512412 11/1998
JP 11-340719 12/1999
(Continued)

OTHER PUBLICATIONS

Invitation to Pay Additional Fees dated Jun. 8, 2021 issued in corresponding IA No. PCT/US2021/016842 filed Feb. 5, 2021.
(Continued)

*Primary Examiner* — Mirza F Alam

(57) ABSTRACT

RFID devices are provided for improving the performance of electronic surveillance article systems. The RFID devices may be modified in any of a number of ways to decrease their peak sensitivity and increase their bandwidth, thereby stabilizing their read range. The performance of an RFID device will depend on the nature of the article to which it is associated, such that the nature of the article to which the RFID device is to be associated may be factored into the design of the RFID device to equalize the performance at an operating frequency of RFID devices associated with different articles. By reducing the peak sensitivity and increasing the bandwidth of RFID devices in an electronic article surveillance system, the size of a transition zone between two read zones of the system may be reduced.

29 Claims, 3 Drawing Sheets

(56) References Cited

U.S. PATENT DOCUMENTS

| | | | | |
|---|---|---|---|---|
| 7,591,422 | B2 | 9/2009 | Maitin | |
| 2001/0013830 | A1* | 8/2001 | Garber | G08B 13/2457 340/572.1 |
| 2005/0200539 | A1 | 9/2005 | Forster et al. | |
| 2006/0186994 | A1 | 8/2006 | Lin et al. | |
| 2007/0296581 | A1 | 12/2007 | Schnee et al. | |
| 2009/0309729 | A1 | 12/2009 | Nichols et al. | |
| 2010/0052865 | A1* | 3/2010 | Eckstein | G08B 13/2448 340/10.4 |
| 2011/0074582 | A1 | 3/2011 | Alexis | |
| 2011/0291803 | A1 | 12/2011 | Bajic et al. | |
| 2012/0044074 | A1* | 2/2012 | Mulla | G08B 13/2448 340/572.1 |
| 2012/0268327 | A1* | 10/2012 | Sardariani | G06K 19/07749 343/700 MS |
| 2013/0187778 | A1 | 7/2013 | Smith | |
| 2014/0266617 | A1 | 9/2014 | Wilkinson | |
| 2015/0069135 | A1 | 3/2015 | Kang et al. | |
| 2016/0253534 | A1 | 9/2016 | Hattori et al. | |
| 2017/0063476 | A1 | 3/2017 | Nair | |
| 2018/0350218 | A1 | 12/2018 | Jeon et al. | |
| 2019/0188982 | A1 | 6/2019 | Lavery et al. | |
| 2020/0394490 | A1* | 12/2020 | Abergel | H05K 1/0298 |
| 2021/0034937 | A1 | 2/2021 | Shakedd et al. | |

FOREIGN PATENT DOCUMENTS

| | | |
|---|---|---|
| JP | 2005-258793 | 9/2005 |
| JP | 2008-519530 | 6/2008 |
| JP | 2009-511999 | 3/2009 |
| JP | 2015-511412 | 4/2015 |
| WO | 02/48980 | 6/2002 |
| WO | 2005/112591 | 12/2005 |
| WO | 2006/050462 | 5/2006 |
| WO | 2014/150531 | 9/2014 |

OTHER PUBLICATIONS

International Search Report and Written Opinion dated Aug. 2, 2021 issued in corresponding IA No. PCT/US2021/016842 filed Feb. 5, 2021.

International Search Report and Written Opinion dated Jul. 19, 2021 issued in corresponding IA No. PCT/US2021/016836 filed Feb. 5, 2021.

Invitation to Pay Additional Fees dated May 26, 2021 issued in corresponding IA No. PCT/US2021/016836 filed Feb. 5, 2021.

International Preliminary Report on Patentability dated Jul. 28, 2022 issued in corresponding IA No. PCT/US2021/016842 filed Feb. 5, 2021.

International Preliminary Report on Patentability dated Jul. 28, 2022 issued in corresponding IA No. PCT/US2021/016836 filed Feb. 5, 2021.

* cited by examiner

CONTROL OF RFID DEVICES FOR INCREASED RELIABILITY AND EFFECTIVENESS IN AN RFID ELECTRONIC ARTICLE SURVEILLANCE SYSTEM

CROSS-REFERENCE TO RELATED APPLICATION

The present application is a 371 of International Application No. PCT/US2021/016842, which was published in English on Aug. 12, 2021, and claims the benefit of U.S. Provisional Patent Application No. 62/970,913 filed Feb. 6, 2020, both of which are incorporated herein by reference in their entireties.

FIELD

The present subject matter relates to radio frequency identification ("RFID") devices. More particularly, the present subject matter relates to controlling RFID device read range for reliability and effectiveness in an electronic article surveillance ("EAS") System using RFID devices.

BACKGROUND

In retail stores, an accurate count of the products on display and/or in storage is important. Additionally, it is important to have an effective anti-theft system in place. RFID tags and labels (which may be collectively referred to herein as "RFID devices") have been employed to perform both of these functions.

An EAS system employing RFID technology has two primary read zones 10 and 20, as shown in FIG. 1, each of which includes an associated RFID reader. The first read zone 10 is an area in the store where the products are presented to the consumer (which may be referred to herein as "inventory zone"), while the second read zone 20 is an area at the exit of the store where any RFID devices that have not been suitably deactivated may be detected (which may be referred to herein as a "detection zone") to trigger some type of alarm, indicating that an attempt is being made to steal them. When a customer properly purchases an item, the cashier either removes or deactivates the RFID device associated with it. If the RFID device is not removed or deactivated, an RFID reader or readers will read the device and cause an alarm or other alert to trigger in the detection zone 20.

Although the above-described systems are widespread, there are certain disadvantages. When using RFID devices/systems for an EAS system, one common problem is that the read range of an RFID device in certain circumstances can be large enough that an RFID device in the inventory zone 10 can be read in the detection zone 20 or vice versa. To reduce this risk, a transition zone 30 is frequently provided between the inventory zone 10 and the detection zone 20 to physically separate the two read zones. However, on account of different RFID devices having greater sensitivity at an operating frequency and/or different articles having different effects on the performance of the associated RFID devices, it is necessary for the transition zone 30 to be relatively large, resulting in retail stores having significant portion of unused space for exhibiting inventory, i.e., reduced inventory zones. It would, thus, be advantageous to provide RFID devices that are configured in a way that allows for the size of the transition zone 30 to be reduced.

SUMMARY

There are several aspects of the present subject matter which may be embodied separately or together in the devices, systems, and methods described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, a method of manufacturing an RFID device for an RFID enabled electronic article surveillance system (hereinafter "EAS system") is disclosed. In some embodiments, the method of manufacturing includes providing an RFID device having relatively low RF conductivity. The method of manufacturing the RFID device includes providing an RFID chip and an antenna and coupling the RFID chip to the antenna. In some embodiments, the antenna of the RFID device is configured with relatively low RF conductivity to reduce the peak sensitivity of the RFID device and to increase the bandwidth of the RFID device.

In another aspect, an RFID enabled EAS system includes at least one RFID device having an antenna. The EAS system further includes a first read zone and a second read zone, with a relatively small transition zone positioned there between. The transition zone is defined to be small as compared to the first and second read zones by reducing the RF conductivity of the antenna of the at least one RFID device, in order to reduce the peak sensitivity of the at least one RFID device and to increase the bandwidth of the at least one RFID device. Reduced peak sensitivity of the at least one RFID device ensures that the RFID device is not read/detected in the first read zone while being physically present in the second read zone and is not read/detected in the second read zone while being physically present in the first read zone. The reduced peak sensitivity of the at least one RFID device with an increase in bandwidth ensures optimal performance of the at least one RFID device within the first and second read zones of the EAS system, while also ensuring the there is no accidental reading of the RFID device in either the first read zone or the second read zone. Thus, conductivity of each RFID antenna is chosen in a manner such that peak sensitivity is reduced without compromise in the performance of the antenna within the first read zone and the second read zone. A reduction in peak sensitivity of the RFID device also directly affects the size of the transition zone of the EAS system. Particularly, since reduction in peak sensitivity of the at least one RFID device ensures that there is no accidental reading of the at least one RFID device, it automatically results in reduction in size of the transition zone of the EAS system. This optimized performance of the at least one RFID device of the EAS system improves the overall reliability and effectiveness of the EAS system, while providing an additional advantage of reduced size of the transition zone in the EAS system.

In another aspect, a method of maximizing performance of RFIF enabled EAS system including a plurality of RFID devices is disclosed. This method involves manufacturing RFID devices having different configurations for tagging different articles that are configured to be monitored by the same EAS system. For example, a first RFID device is manufactured to include a first RFID chip and a first antenna. The first antenna is coupled to the first RFID chip to define the first RFID device configured to be associated to a first article. Further, a second RFID device having a second RFID chip and a second antenna is provided, with the second RFID chip being coupled to the second RFID antenna. The second RFID device is configured to be associated to a second article. The two articles are configured to differently affect the performance of the associated RFID devices, with the two antennas being differently configured based at least in part on the natures of the first and second articles so as to have similar read range at a predetermined frequency. In one embodiment, the second antenna is configured to have a larger size than the first antenna, and the second antenna is formed of a second material having a lower conductivity than a first material forming the first antenna.

DETAIL DESCRIPTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The inventory zone 10 of an EAS system typically includes a variety of articles, tagged with a variety of RFID devices, with each RFID device being differently configured. On account of the differently configured articles (which have different effects on the performance of the associated RFID devices) and the different configurations of the RFID devices themselves, some RFID devices within an EAS system will have an especially large sensitivity at the operating frequency of the RFID readers of the EAS system. This high sensitivity results in such RFID devices having large read ranges, which can increase the chance of such RFID devices being read by the RFID reader of a read zone in which the RFID device is not present (i.e., a false alarm). As such, according to one aspect of the present disclosure, the configuration of an RFID device may be modified from conventional design to reduce its read range.

There are several factors that can affect the performance characteristics of an RFID device, such that there are various modifications that may be made to an RFID device (either individually or in combination) to change its performance and read range. At its most basic, an RFID device contains an RFID chip coupled to an antenna, with the RFID chip containing various information (e.g., a unique identifier) and the antenna being configured to receive signal or energy from an RFID reader and return signals to the RFID reader. The size and material composition of the antenna will affect its conductivity, which affects the read range and performance of the associated RFID device. Generally speaking, a larger antenna (i.e., one having a relatively large footprint and/or thickness) will tend to have a greater conductivity and, hence, read range than a smaller antenna formed of the same material. Similarly, at a given antenna size, an antenna formed of a material having a relatively large conductivity will have a greater read range than an antenna formed of a material having a lower conductivity.

Figure 1:
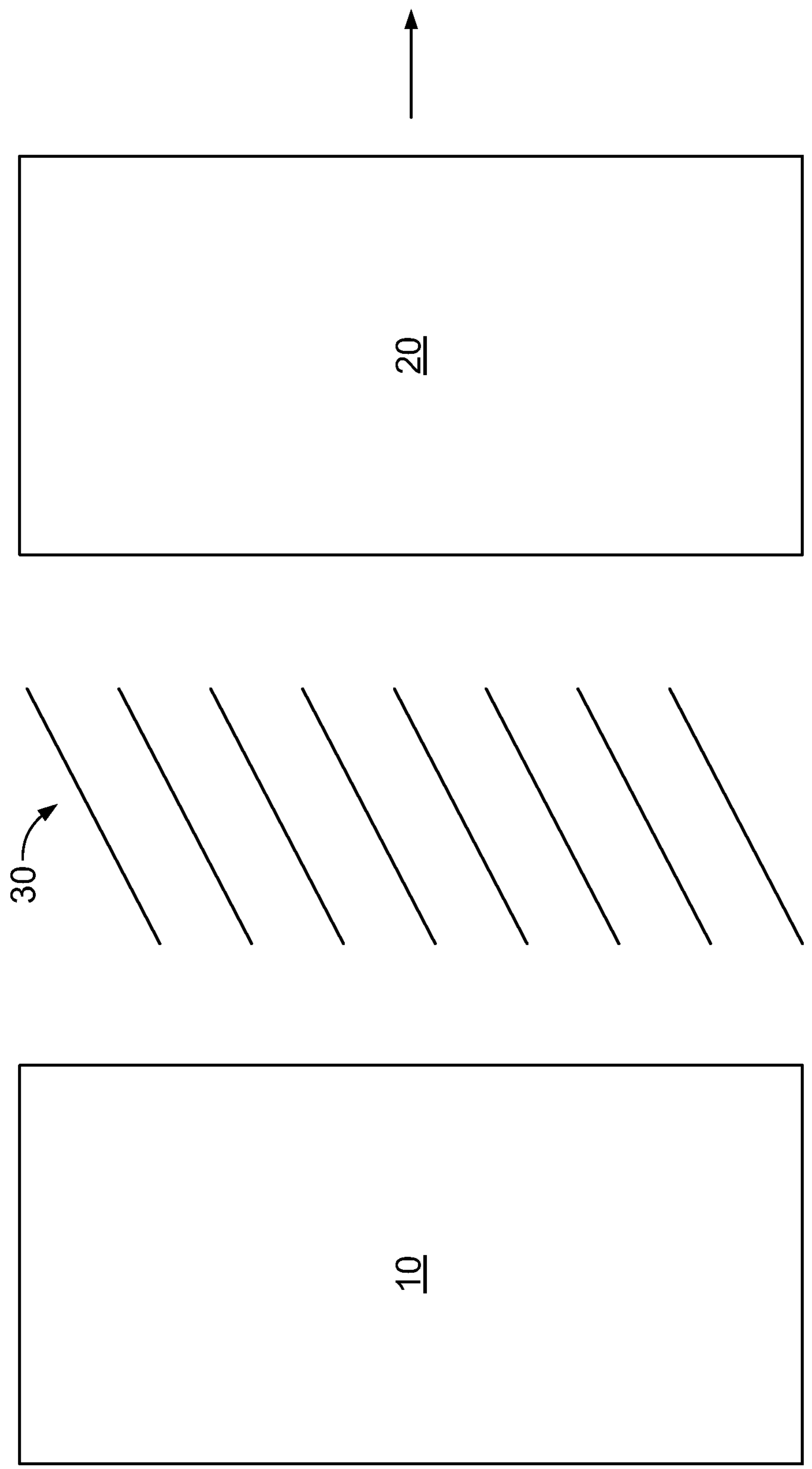
FIG. 1 PRIOR ART
FIG. 1 is an illustrative representation of a conventional electronic article surveillance system using RFID devices.
Figure 2A:
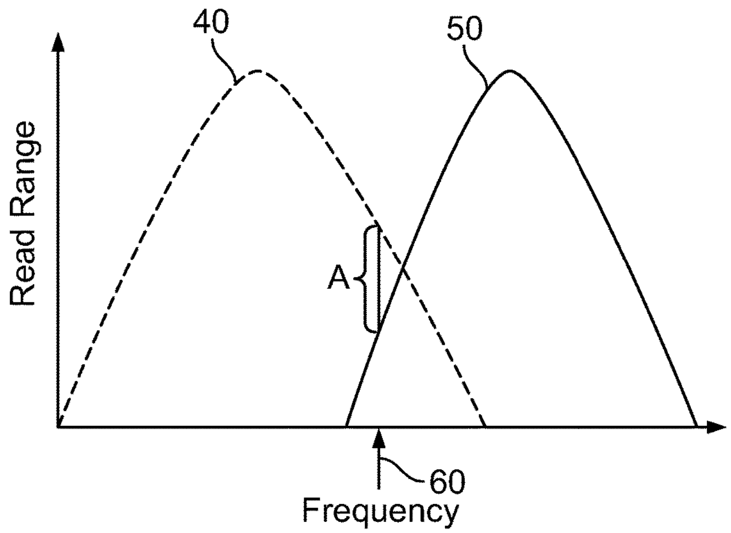
FIG. 2A PRIOR ART
FIG. 2A is a graph showing the relationship between frequency and read range for RFID devices having conventional antennas.
Figure 2B:
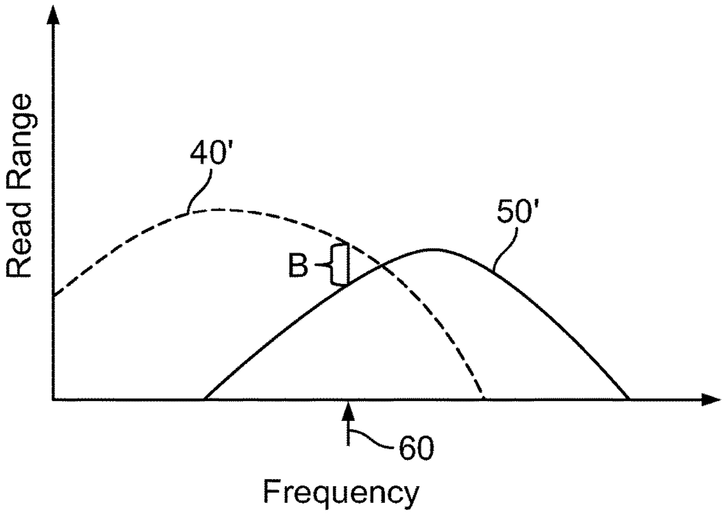
FIG. 2B is a graph showing the relationship between frequency and read range for RFID devices having lower conductivity antennas according to an aspect of the present disclosure.

FIGS. 2A and 2B illustrate how a change in the conductivity of an antenna can affect its read range for different product types. In FIGS. 2A and 2B, the broken line (identified at 40 in FIG. 2A and at 40' in FIG. 2B) represents an RFID device attached to a denim product, while the solid line (identified at 50 in FIG. 2A and at 50' in FIG. 2B) represents an RFID device attached to cardstock, which has very different dielectric properties than denim. The operating frequency of the RFID readers of an EAS system is represented by line 60. The antennas of the RFID devices in FIG. 2A are provided according to conventional design, thereby having relatively high conductivity. This may include the antennas of such RFID devices being composed of a highly conductive material (e.g., an aluminum foil) and/or a material provided in a thickness on the order of approximately 10 um (microns). In contrast, the modified antennas of the RFID devices of FIG. 2B (which may have the same footprint as the antennas represented in FIG. 2A) are provided according to the present disclosure, with a lower conductivity, which may be achieved by employing an antenna material having a relatively low conductivity (e.g., a conductive ink, which has a lower conductivity in comparison to an aluminum foil) and/or a material provided in a smaller thickness (e.g., a thickness in the range of approximately 0.1 um to 10 um).

As can be seen by comparing FIGS. 2A and 2B, the higher radio frequency (RF) conductivity antennas of FIG. 2A have a greater peak sensitivity than the antennas of FIG. 2B, along with having a greater sensitivity and higher read range at the operating frequency 60. By reducing read range at the operating frequency, antennas according to the present disclosure are less likely to result in false alarms. Additionally, the shorter read range of antennas according to the present disclosure allow for a reduction in the size of a transition zone 30 of an EAS system, which may allow for a larger inventory zone 10.

Additionally, it will be seen that the conventional antennas of FIG. 2A have a relatively narrow bandwidth, with the sensitivity (and read range) of the antennas falling off sharply from the peak sensitivity. As a result of this narrow bandwidth, it is more likely for there to be a relatively large difference between the sensitivity and read range of two antennas associated with different articles at different frequencies. For example, this difference in sensitivity and read range at the operating frequency 60 is represented in FIG. 2A at "A." Lower conductivity antennas according to the present disclosure have a greater bandwidth, with there being a more gradual decrease in the sensitivity and read range of the antennas away from the peak sensitivity. By increasing the bandwidth (and decreasing the variability of the sensitivity and read range), it is more likely for the sensitivity and read range of antennas associated with different articles to be similar at different frequencies, including at the operating frequency 60, as represented in FIG. 2B at "B." By rendering the performance of the antennas more stable (including reducing the range of sensitivities at the operating frequency 60), there is more flexibility in arranging the articles in the inventory zone 10, as it becomes less necessary to particularly position certain articles farther from the detection zone 20 so as to avoid false alarms. For example, based at least in part on their nature, denims tagged with RFID devices having comparatively thicker antennas as compared to cotton shirts can be placed farther away in the first read zone.

Figure 3:
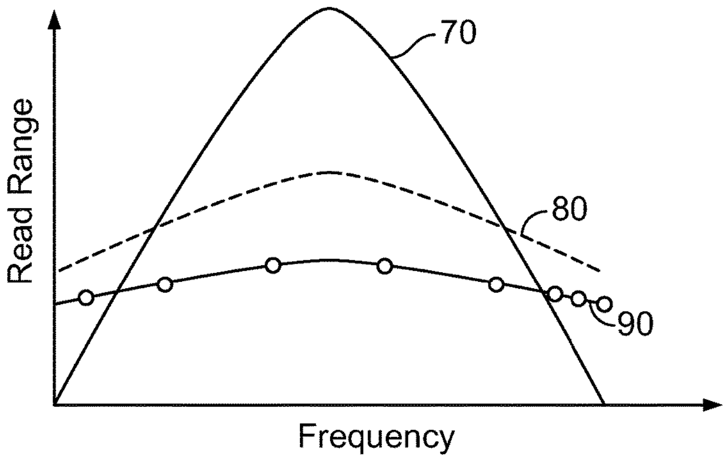
FIG. 3 is a graph showing the relationship between frequency and read range for RFID devices having antennas with different levels of conductivity.

FIG. 2B illustrates antennas having a decreased RF conductivity compared to the antenna of a conventional RFID device, resulting in a decreased peak sensitivity and increased bandwidth. The antennas represented in FIG. 2B may be considered to have a "medium" or "intermediate" conductivity, which could be further decreased by employing aspects of the present disclosure. FIG. 3 shows the change in read range against frequency as the antenna RF conductivity is reduced, with solid line 70 representing the high-conductivity antenna of a conventional RFID device (as in FIG. 2A), broken line 80 representing an RFID device with "medium" antenna conductivity (as in FIG. 2B), and dotted line 90 representing an RFID device with low antenna conductivity. As shown in FIG. 3, decreasing antenna RF conductivity may be correlated to both decreased read range and increased bandwidth, with a sufficiently "low" conductivity antenna resulting in a substantially uniform read range at a very wide range of frequencies.

In some embodiments, configuring the antenna with a relatively low RF conductivity causes a reduction in the peak sensitivity of greater than or equal 1 dB, 1.5 dB, 2.0 db, 2.5 db. 3.0 db, 3.5 db, 4.0 db, 4.5 db, 5.0 db, or greater.

In another embodiment configuring the antenna with a relatively low RF conductivity causes an increase in the bandwidth of greater than or equal to 5%, 6%, 7%, 8%, 9% 10%, 10.5%, 11%, 11.5%, 12%, 12.5%, 13%, 13.5%, 14%, 14.5%, 15%, or greater.

In yet another embodiment, configuring the antenna with relatively low RF conductivity causes a reduction in the peak sensitivity as described above in combination with an associated increase in the bandwidth as described above.

Thus, it should be understood that techniques according to the present disclosure may be employed to stabilize the performance of the RFID devices of an EAS system. For example, techniques according to the present disclosure may be employed to render the read ranges of two RFID devices the same or at least substantially the same at the operating frequency of an EAS system even if the two RFID devices having very differently configured antennas (e.g., one having a much larger aspect ratio than the other) and are associated with very different articles. The particular techniques employed and the particular configuration of an antenna of an RFID device according to the present disclosure may depend on various factors. These factors include (but are not limited to) the operating frequency of the RFID readers of the EAS system, the critical read range, the article to which the RFID device is to be associated, the manner in which the RFID device is to be paired to its associated article, the location of the RFID device on the associated article, any required structural features of the RFID device (e.g., the material composition and/or size of the antenna), and combinations thereof. Different antenna configurations may be tested (e.g., by electromagnetic simulation) to determine whether a particular configuration results in the desired performance characteristics.

As described above, employing a conductive ink and/or decreasing the thickness of an antenna are possible approaches to decreasing the conductivity of the antenna. When employing a conductive ink, the conductivity of an antenna having a particular size may be varied by adjusting the amount of conductive material in the ink (e.g., by adjusting the ratio of conductive material to non-conductive material in the ink). As the ratio of conductive material to non-conductive material decreases (i.e., as less conductive material is included in the conductive ink), the conductivity of the antenna will decrease, per the relationship illustrated in FIG. 3.

In one embodiment, relative conductivity of the conductive ink is more than %5, 6%, 7%, 8%, 9%, 10%, 10.5%, 11%, 11.5%, 12%, 12.5%, 13%, 13.5%, 14%, 14.5%, or 15% lower than the conductivity of the foil material used for the antenna.

In another embodiment, the relative conductivity of the conductive ink is more than %5, 6%, 7%, 8%, 9%, 10%, 10.5%, 11%, 11.5%, 12%, 12.5%, 13%, 13.5%, 14%, 14.5%, or 15% lower than the conductivity of the foil material for an equal thickness of the foil material.

As for the thickness of an antenna, for a given material type (e.g., aluminum foil or conductive ink), the thickness of the antenna may be decreased to arrive at the desired conductivity and device performance. In one implementation, the thickness of the antenna is in the range of 0.1 um to 10 um to reduce the peak sensitivity of the RFID device by 3 dB and correspondingly increase the bandwidth of the RFID device by 10%. The thickness of the antenna can also be equal to or lower than one skin depth in a material forming the antenna at the operating frequency.

Figure 4:
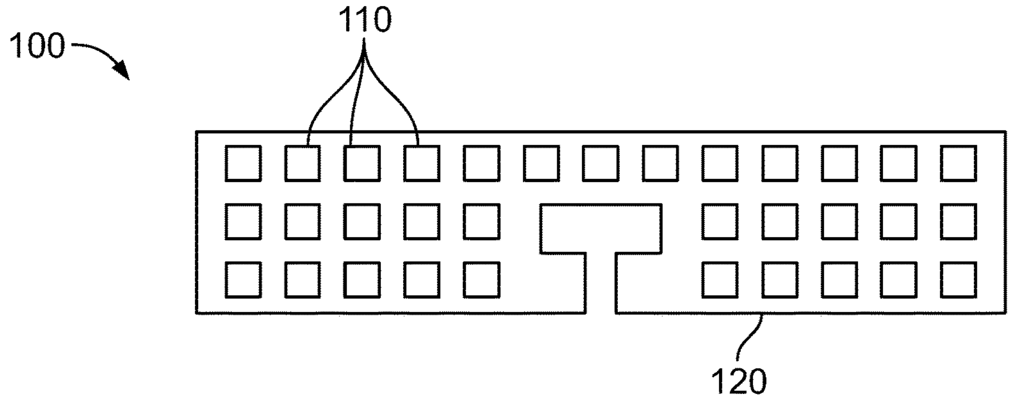
FIG. 4 is a top plan view of an exemplary embodiment of a reduced conductivity antenna according to an aspect of the present disclosure.

It should be understood that changing the material composition and/or thickness of an antenna are not the only ways to change its conductivity. For example, material may be omitted or removed from the interior of an antenna, as shown in FIG. 4. In the embodiment of FIG. 4, an antenna 100 is provided with a plurality of openings or holes 110 defined within its perimeter 120. Compared to an antenna formed of the same material and having the same size and perimeter, the antenna 100 of FIG. 4 will have a lower conductivity, due to the holes 110 effectively introducing resistance into the antenna 100. It should be understood that the holes 110 may be formed according to any suitable approach (e.g., by printing a conductive ink in a particular pattern or by forming a conventional antenna and then removing material in selected location to define holes) and that any number, size, location, and configuration of holes may be employed without departing from the scope of the present disclosure. In general, as the size and/or number of holes increases, the conductivity of the antenna is decreased, along with the RFID device read range.

Figure 5:
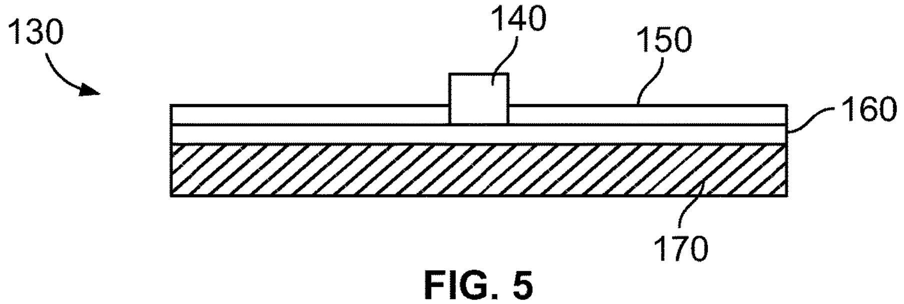
FIG. 5 is a front elevational view of an exemplary embodiment of a reduced conductivity RFID device according to an aspect of the present disclosure.

FIG. 5 illustrates another possible approach to controlling the bandwidth and performance of an RFID device. In the RFID device 130 of FIG. 5, the RFID chip 140 and antenna 150 are associated to one side of a non-conductive substrate 160 (formed of a paper or plastic material, for example). A control layer 170 is associated to the opposite side of the substrate 160, with the control layer 170 being formed of a conductive ink or thin vapor-deposited metal or other radio frequency-absorbing material. The control layer 170 can be applied in any of the known ways in the art including, but not limited to lamination onto the back of the substrate 160 and/or printing by a thermal or ink jet printer. The control layer 170 may extend across the entirety of the associated surface of the substrate 160 or cover only a portion thereof.

The control layer 170 will absorb some of the RF energy that would otherwise be received by the antenna 150, effectively decreasing the read range of the antenna 150, in accordance with an aspect of the present disclosure. Similar to an antenna, the configuration of the control layer 170 (including its size, thickness, and material composition) may be varied to adjust its conductivity, with an increase in the conductivity of the control layer 170 effectively reducing the conductivity of the associated antenna 150 (e.g., according to the relationship illustrated in FIG. 3). The use of a control layer 170 may be advantageous if the read range and bandwidth of an antenna are to be modified, but there are restrictions on the extent to which the antenna itself may be modified.

Figure 6:
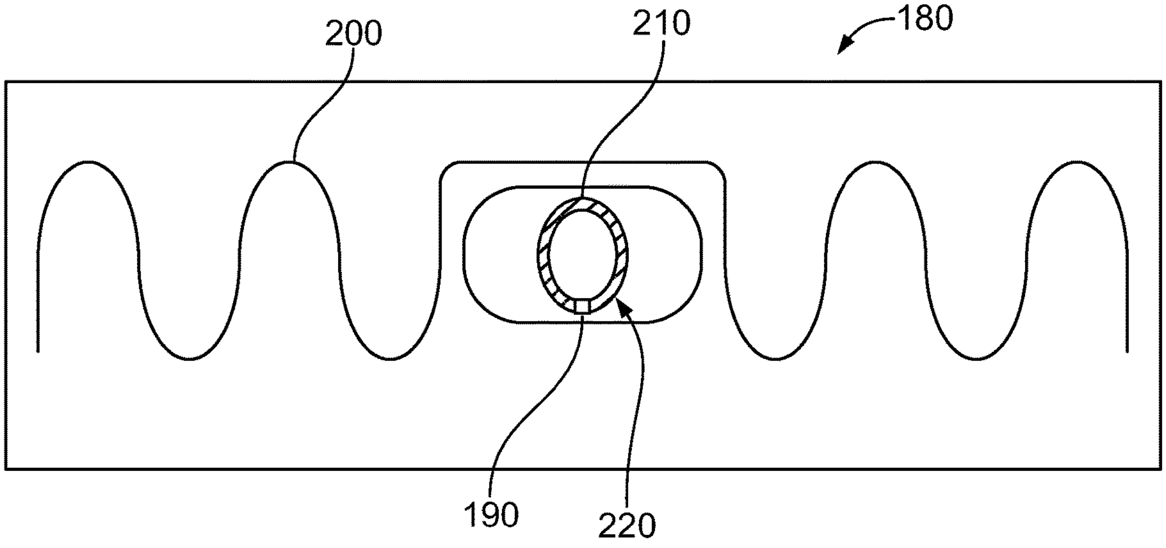
FIG. 6 is a top plan view of another exemplary embodiment of a reduced conductivity RFID device according to an aspect of the present disclosure.

FIG. 6 illustrates another exemplary RFID device 180 in which a secondary structure may be employed to modify the performance of an associated antenna. In the embodiment of FIG. 6, the RFID device 180 includes an RFID chip 190 and an antenna 200, as in the embodiment of FIG. 5. However, rather than the RFID chip 190 being physically connected to the antenna 200 (e.g., using pads according to conventional design), as in FIG. 5, the RFID chip 190 is instead connected to a conductive loop 210 to define a reactive strap 220 that is physically spaced (but still coupled to) the antenna 200. Similar to the control layer 170 of FIG. 5, the conductive loop 210 will absorb some of the RF energy that would otherwise be received by the antenna 200, effectively decreasing the read range of the antenna 200, in accordance with an aspect of the present disclosure. As described above with regard to an antenna or a control layer, the configuration of the conductive loop 210 (including its size, thickness, and material composition) may be varied to adjust its conductivity, with an increase in the conductivity of the conductive loop 210 effectively reducing the conductivity of the associated antenna 200 (e.g., according to the relationship illustrated in FIG. 3), thereby reducing the sensitivity of the associated antenna 200. In some embodiments, the conductive loop 210 is made of a conductive material different from that used for the antenna 200. For example, if the antenna 200 is made of copper, the conductive loop could be made of Aluminum. In another embodiment the conductive loop is formed of a conductive ink having a lower conductivity than a conductive foil material used for the antenna. Thus, the conductive loop 210 may be configured to have greater resistance compared to the antenna.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A method of manufacturing an RFID device for a RFID enabled EAS system, the method comprising:
providing an antenna;
providing an RFID chip connected to a conductive loop, the RFID chip and the conductive loop being physically spaced from the antenna; and
coupling the RFID chip to the antenna via a non-contact connection, wherein the conductive loop is formed of a material different than a material of the antenna and is configured to have a greater resistance compared to the antenna to render the antenna to have low radio frequency (RF) conductivity to reduce a peak sensitivity of the RFID device and to increase an associated bandwidth of the RFID device.

2. The method of claim 1, wherein configuring the antenna with low RF conductivity causes a reduction in the peak sensitivity of greater than or equal 1 dB.

3. The method of claim 1, wherein configuring the antenna with low RF conductivity causes an increase in the bandwidth of greater than or equal to 10%.

4. The method of claim 1, wherein configuring the antenna with low RF conductivity causes a reduction in the peak sensitivity of greater than 1 dB with an associated increase in the bandwidth of greater than 10%.

5. The method of claim 1, wherein said providing the antenna includes forming the antenna with a low conductivity material comprising a conductive ink having a lower conductivity than a conductive foil material as used for the antenna.

6. The method of claim 5, wherein the conductivity of the conductive ink is more than 10% lower than the conductivity of the foil material.

7. The method of claim 6, wherein the conductivity of the conductive ink is more than 10% lower than the conductivity of the foil material for an equal thickness of the foil material with the conductive ink.

8. The method of claim 1, wherein said providing the antenna includes providing the antenna with a small thickness to reduce the peak sensitivity and increase the bandwidth of the RFID device.

9. The method of claim 8, wherein the thickness of the antenna is in the range of 0.1 um to 10 um to reduce the peak sensitivity of the RFID device by 3 dB and correspondingly increase the bandwidth of the RFID device by 10%.

10. The method of claim 8, wherein the thickness of the antenna is equal to or lower than one skin depth in a material forming the antenna.

11. The method of claim 1, wherein
said providing the antenna includes forming the antenna with a combination of a conductive material and a non-conductive material.

12. The method of claim 1, wherein said providing the antenna includes forming one or more holes in the antenna.

13. The method of claim 1, further comprising incorporating a control layer into the RFID device, separate from the RFID chip and the antenna, wherein the control layer is at least partially formed of a material configured to absorb radio frequency energy.

14. The method of claim 1, wherein the conductive loop is formed of a conductive ink having a lower conductivity than a conductive foil material used for the antenna.

15. The method of claim 14, wherein the conductivity of the conductive ink is more than 10% lower than the conductivity of the foil material.

16. The method of claim 15, wherein the conductivity of the conductive ink is more than 10% lower than the conductivity of the foil material for an equal thickness of the foil material with the conductive ink.

17. An RFID enabled electronic article surveillance system comprising:
at least one RFID device including
an antenna and
a RFID chip coupled to the antenna via a non-contact connection, the RFID chip being connected to a conductive loop, wherein the conductive loop being physically spaced from the antenna;
a first read zone;
a second read zone; and a transition zone positioned between the first and second read zones, wherein the conductive loop is formed of a material of the antenna and is configured to have a greater resistance compared to the antenna to render the antenna of the at least one RFID device is configured to have reduced RF conductivity to reduce the peak sensitivity of the at least one RFID device and increase the bandwidth of the at least one RFID device, to allow the at least one RFID device be read only in the first read zone while it is present in the first read zone and be read only in the second read zone while present in the second read zone.

18. The RFID enabled electronic article surveillance system of claim 17, wherein configuring the antenna with low RF conductivity causes a reduction in the peak sensitivity of greater than or equal 1 dB.

19. The RFID enabled electronic article surveillance system of claim 17, wherein configuring the antenna with low RF conductivity causes an increase in the bandwidth of greater than or equal to 10%.

20. The RFID enabled electronic article surveillance system of claim 17, wherein configuring the antenna with low RF conductivity causes a reduction in the peak sensitivity of greater than 1 dB with an associated increase in the bandwidth of greater than 10%.

21. The RFID enabled electronic article surveillance system of claim 17, wherein the antenna is formed of a conductive ink having a lower conductivity than a conductive foil material.

22. The RFID enabled electronic article surveillance system of claim 21, wherein the conductivity of the conductive ink is more than 10% lower than the conductivity of the foil material.

23. The RFID enabled electronic article surveillance system of claim 22, wherein the conductivity of the conductive ink is more than 10% lower than the conductivity of the foil material for an equal thickness of the foil material with the conductive ink.

24. The RFID enabled electronic article surveillance system of claim 17, wherein said providing the antenna includes providing the antenna with a small thickness to reduce the peak sensitivity and increase the bandwidth of the RFID device.

25. The RFID enabled electronic article surveillance system of claim 24, wherein the antenna has a thickness in the range of 0.1 um to 10 um to reduce the peak sensitivity of the RFID device by 3 dB and correspondingly increase the bandwidth of the at least one RFID device by 10%.

26. The RFID enabled electronic article surveillance system of claim 24, wherein the thickness of the antenna is equal to or lower than one skin depth in a material forming the antenna.

27. The RFID enabled electronic article surveillance system of claim 17, wherein at least one hole is defined in the antenna.

28. The RFID enabled electronic article surveillance system of claim 17, wherein the at least one RFID device includes a control layer separated from the RFID chip and the antenna, and the control layer is at least partially formed of a material configured to absorb radio frequency energy.

29. The RFID enabled electronic article surveillance system of claim 17, wherein the conductive loop is formed of a conductive ink having a lower conductivity than a conductive foil material used for the antenna.

* * * * *